United States Patent
Alexander et al.

(10) Patent No.: US 9,569,370 B2
(45) Date of Patent: *Feb. 14, 2017

(54) STORING A SYSTEM-ABSOLUTE ADDRESS (SAA) IN A FIRST LEVEL TRANSLATION LOOK-ASIDE BUFFER (TLB)

(71) Applicant: International Business Machines Corporation, Armonk, NY (US)

(72) Inventors: Khary J. Alexander, Poughkeepsie, NY (US); Jonathan T. Hsieh, Poughkeepsie, NY (US); Christian Jacobi, Schoenaich (DE); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/248,100

(22) Filed: Aug. 26, 2016

(65) Prior Publication Data

US 2016/0357685 A1    Dec. 8, 2016

Related U.S. Application Data

(63) Continuation of application No. 15/073,681, filed on Mar. 18, 2016, now Pat. No. 9,460,023, which is a continuation of application No. 13/756,709, filed on Feb. 1, 2013, now Pat. No. 9,292,453.

(51) Int. Cl.
*G06F 12/1045*    (2016.01)
*G06F 12/10*      (2016.01)
*G06F 12/08*      (2016.01)

(52) U.S. Cl.
CPC ....... *G06F 12/1054* (2013.01); *G06F 12/0897* (2013.01); *G06F 2212/60* (2013.01); *G06F 2212/68* (2013.01)

(58) Field of Classification Search
None
See application file for complete search history.

(56) References Cited

U.S. PATENT DOCUMENTS

| 2006/0206686 A1 | 9/2006 | Banerjee et al. |
| 2014/0052917 A1 | 2/2014 | Koka et al. |
| 2015/0095610 A1 | 4/2015 | Ben-Meir |

*Primary Examiner* — Brian Peugh
*Assistant Examiner* — Dustin Bone
(74) *Attorney, Agent, or Firm* — Cantor Colburn LLP; William A. Kinnaman, Jr.

(57) ABSTRACT

Embodiments relate to a method, system and computer program product for storing a system-absolute address (SAA) in a first level look-aside buffer (TLB). In one embodiment, the system includes a central processor including the TLB and general purpose registers (GPRS). The TLB is configured for storing the SAA. The central processor is configured for issuing a load system-absolute address (LSAA) instruction. The system includes a translation unit that is in communication with the TLB of the central processor. The system is configured to perform a method including determining, based on the LSAA instruction being issued, whether the SAA is stored in the TLB. The method includes sending a translation request to the translation unit from the central processor based on the SAA not being stored in the TLB. The method includes determining the SAA by the translation unit based on receiving the translation request.

1 Claim, 4 Drawing Sheets

STORING A SYSTEM-ABSOLUTE ADDRESS (SAA) IN A FIRST LEVEL TRANSLATION LOOK-ASIDE BUFFER (TLB)

DOMESTIC PRIORITY

This application is a continuation of U.S. patent application Ser. No. 15/073,681, filed Mar. 18, 2016, now U.S. Pat. No. 9,460,023, which is a continuation of U.S. patent application Ser. No. 13/756,709, filed Feb. 1, 2013 now U.S. Pat. No. 9,292,453, the contents of which are incorporated by reference herein in their entirety.

BACKGROUND

The present disclosure relates generally to a system for accessing and storing data, and more specifically, to a system for storing a system-absolute address (SAA) in a first level translation look-aside buffer (TLB) located on a central processor.

In some situations, it may be necessary for a central processor to compute a system-absolute address (SAA) based on a given virtual address (VA). The SAA may be needed, for example, if the SAA is provided to an accelerator (e.g., a cryptographic accelerator or a data movement accelerator) by the central processor.

In one known approach, the SAA is computed using a translation unit (XU). Specifically, the central processor may send a request to the XU with a perform translator operation (PXLO) instruction. The XU may then perform the translation requested, or look up the results in a second level translation look-aside buffer (TLB2). The TLB2 is located on the XU. The XU may then send a PXLO result back to the central processor. However, this approach may have several drawbacks. For example, access to the XU is relatively slow, as the XU is located physically further away from the central processor than execution pipelines. Moreover, the SAA is not stored a first level translation look-aside buffer (TLB1) located on the central processor. Because the SAA is not stored in the TLB1, the TLB1 may indicate a miss if a storage location is later accessed by a data cache (D-cache), and the exact same virtual to absolute address translation request that was performed for the PXLO instruction is sent to the XU again. The exact same translation request may be sent relatively often, as the storage location needs to be tested for access exceptions before the SAA is provided to the accelerator.

SUMMARY

Embodiments relate to a method, system and computer program product for storing a system-absolute address (SAA) in a first level look-aside buffer (TLB). In one embodiment, the system includes a central processor including the TLB and general purpose registers (GPRS). The TLB is configured for storing the SAA. The central processor is configured for issuing a load system-absolute address (LSAA) instruction. The system includes a translation unit that is in communication with the TLB of the central processor. The system is configured to perform a method including determining, based on the LSAA instruction being issued, whether the SAA is stored in the TLB. The method includes sending a translation request to the translation unit from the central processor based on the SAA not being stored in the TLB. The method includes determining the SAA by the translation unit based on receiving the translation request. The method includes sending the SAA from the translation unit to the TLB and writing the SAA to the TLB. The LSAA instruction is then restarted. The method includes obtaining the SAA from the TLB based on the LSAA instruction being issued, and writing the SAA to the GPRS.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

An embodiment for storing a system-absolute address (SAA) in a first level look-aside buffer (TLB1) of a central processor is disclosed (the TLB1 is also referred to as the TLB). Based on a load SAA (LSAA) instruction being issued, if the SAA is stored in the TLB1 the SAA is obtained from the TLB1 and multiplexed with cache data from a level one (L1) cache located on the central processor. The SAA is then sent to general purpose registers (GPRS) located on the central processor. In one embodiment, the LSAA instruction also checks for access exceptions simultaneously as the SAA is sent to the GPRS. In one exemplary embodiment, the central processor is in communication with a translation unit (XU). If the SAA is not stored in the TLB1, then a miss request is sent to the translation unit. The translation unit may then determine the SAA, and send the SAA as well as other information such as, for example, a page protection bit, back to the TLB1. The SAA is then written to the TLB1. In one embodiment, if the SAA is stored on the TLB1 but not the directory, then a cache line that indicates the SAA may be loaded from a higher level of cache. The cache line may then be written into the directory and the cache.

The approach as disclosed in exemplary embodiments will ensure that the SAA is written to the TLB1 of the central processor, which in turn improves latency. The system as disclosed also performs access exception checking simultaneously as the SAA is loaded into the GPRS.

Figure 1:
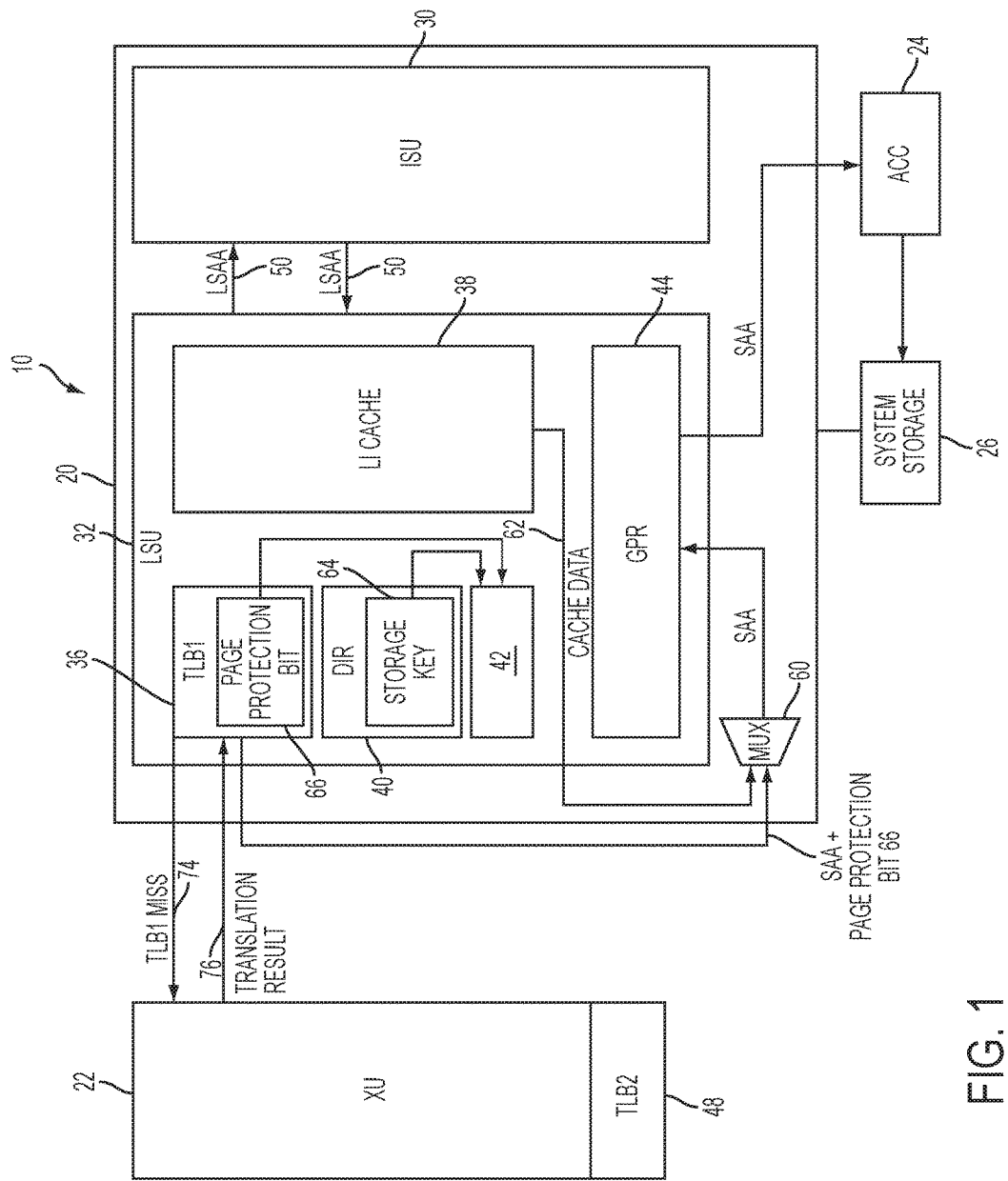
FIG. 1 depicts an exemplary data processing system in accordance with an embodiment.

Referring now to FIG. 1, an exemplary data processing system 10 is shown. The data processing system 10 includes a central processor 20, a translator co-processor or translation unit (XU) 22, an accelerator 24, and system storage 26. The XU 22 translates requests containing a virtual address (VA) into translation-results containing a system-absolute address (SAA) within the system storage 26. The accelerator 24 may be, for example, a cryptographic accelerator or a data movement accelerator. The central processor 20 includes an instruction store unit (ISU) 30 and a load store unit (LSU) 32. The LSU 30 includes a first level translation look-aside buffer (TLB1) 36, a level one (L1) cache 38, a directory 40, exception checking logic 42, and general purpose registers (GPRS) 44. A second level translation look-aside buffer (TLB2) 48 is located on the XU 24.

A load system-absolute address (LSSA) instruction 50 may be issued by the ISU 30 to the LSU 32. The LSAA instruction 50 loads an SAA into the GPRS 44, while simultaneously checking for access exceptions. It should be noted that the results of the LSSA instruction 50 are available in cycle six of execution. Typical load instructions generally have results available in cycle three of execution.

Similar to a typical load instruction, the LSU 32 performs a lookup of the directory 40 and the TLB1 36 for a specific SAA based on the LSAA instruction 50 being issued from the ISU 30. In one embodiment, if there is a hit result for both the directory 40 and the TLB1 36 (e.g., both the TLB1 36 and the directory 40 contain the specific SAA), then the SAA is taken from the TLB1 36 (along with a page protection bit 66, which is discussed below), and sent to a multiplexer 60. The multiplexer 60 also receives cache data 62 from the L1 cache 38. The multiplexer 60 may then multiplex the SAA with the cache data 62, and then sends the SAA to the GPRS 44. The SAA is then written to the GPRS 40. During certain operations, the SAA may be needed by the accelerator 24. The SAA may be sent to the accelerator 24 by the GPRS 44.

It should be noted that while a hit result for both the directory 40 and the TLB1 36 is discussed, in some embodiments a hit result may only be needed for the TLB1 36 and not the directory based on the type of computer architecture. That is, if there is a hit result in just the TLB1 36 (and not the directory 40), then the SAA is taken from the TLB1 36 and sent to a multiplexer 60.

In one embodiment, the LSAA instruction 50 also checks for access exceptions simultaneously as the SAA is loaded into the GPRS 44. It is possible to perform access exceptions if there are hit results for both the directory 40 and the TLB1 36 because the directory 40 stores a storage key 64 necessary for performing the access exception checking (however, it should be noted that some architectures do not need the storage key in the directory for exception checking). The storage key 64 is used by an operating system or software for storage access protection. The TLB1 36 also stores the page protection bit 66. For example, in one embodiment, if the page protection bit 66 is zero, the central processor 20 permits both fetching and storing to a page frame, if the page protection bit 66 is one, only fetching is permitted. In particular, the SAA and the page protection bit 66 from the TLB1 36 as well as a storage key 64 from the directory 40 may be sent to the access exception checking logic 42 based on a hit result being generated for both the directory 40 and the TLB1 36. The access exception checking logic 42 checks for access exceptions associated with the system storage 26. In one embodiment, the LSAA instruction 50 provides an indication of whether the access exception checking logic 42 checks for fetch-type access exceptions only, or fetch-type and store-type access exceptions both, and is discussed in greater detail below.

If the SAA is stored in the TLB1 36, but not the directory 40 (e.g., there is a hit result for just the TLB1 36), then the LSAA instruction 50 is sent back to the ISU 30. A cache line indicating the SAA may be loaded from a higher level of cache (not shown) such as, for example, an L2 cache, an L3 cache, or any other higher level of cache that may be available. The cache line may then be written into the directory 40. Once the cache line is written to the directory 40, the LSAA instruction 50 may be restarted.

If the SAA is not stored on the TLB1 36 (e.g., there is a miss for the TLB1 36), then the LSAA instruction is sent back to the ISU 30. The TLB1 36 may then send a miss request 74 to the XU 22. The miss request 74 requests the SAA from the XU 22. The XU 22 may either perform the translation requested, or look up the SAA in the TLB2 48. The XU 22 may then return the results of the translation in a translation result 76 to the TLB1 36. The translation result 76 includes the SAA, as well as other information. In particular, the translation result 76 may also include the page protection bit 66. Both the SAA and the page protection bit 66 are written to the TLB1 36. Once the SAA and the page protection bit 66 are written to the TLB1 36, the LSAA instruction 50 may be restarted.

Figure 2:
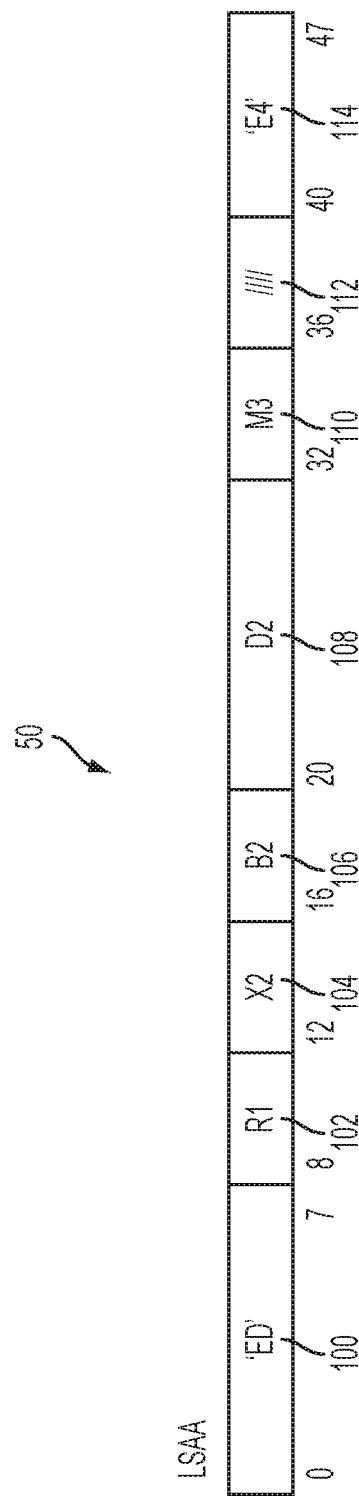
FIG. 2 depicts a load system-absolute address (LSAA) instruction in accordance with an embodiment.

FIG. 2 is an exemplary illustration of an instruction encoding for the LSAA instruction 50. In one embodiment, the LSAA instruction 50 is defined in millicode (i.e., vertical microcode). In the embodiment as shown, a milli-op code 100 labeled as 'ED' identifies the LSAA instruction 50. An operand 102 labeled as 'R1' indicates a GPRS address indicating which specific register of the GPRS 44 (FIG. 1) is loaded with the SAA. The operands 104, 106, and an offset 108 are used to determine the location of the VA in storage. The operand 104 labeled as 'X2' indicates an index address, the operand 106 labeled as 'B2' indicates a base address, and the offset 108 labeled as 'D2' indicates a displacement in storage. Specifically, the specific register of the GPRS 44 specified by the operand 102 is loaded with the SAA of the VA determined as by $D_2(X_2, B_2)$. An operand 110 is a mask field for indicating if the access exception checking logic 42 (shown in FIG. 1) checks for fetch-type access exceptions only, or both fetch-type and store-type access exceptions. For example, in one embodiment if the M3 bit in the mask field is '0' then the access exception checking logic 42 checks for fetch-type access exceptions only, and if the M3 bit in the mask field is '1' then the access exception checking logic 42 checks for store-type access exceptions as well. An operand 112 represents reserved or unused bits. A milli-op code 114 labeled as 'E4' identifies the LSAA instruction 50.

In one embodiment, bits 0:1 of the result of the LSAA as put into the GPRS 44 contain an indication of a frame or page size which may be used for store recording or other uses. The page size may be loaded along with the SAA into the specific register of the GPRS 44 (shown in FIG. 1) indicated by the operand 102 (e.g., the operand 'R1'). In particular, Table 1 is one exemplary embodiment illustrating values of bits 0:1 and the corresponding page sizes that may be used.

TABLE 1

| Bits 0:1 | Page Size |
|---|---|
| '00' b | 4 KB frame |
| '10' b | 1 MB frame |
| '11' b | 2 GB frame |

Figure 3:
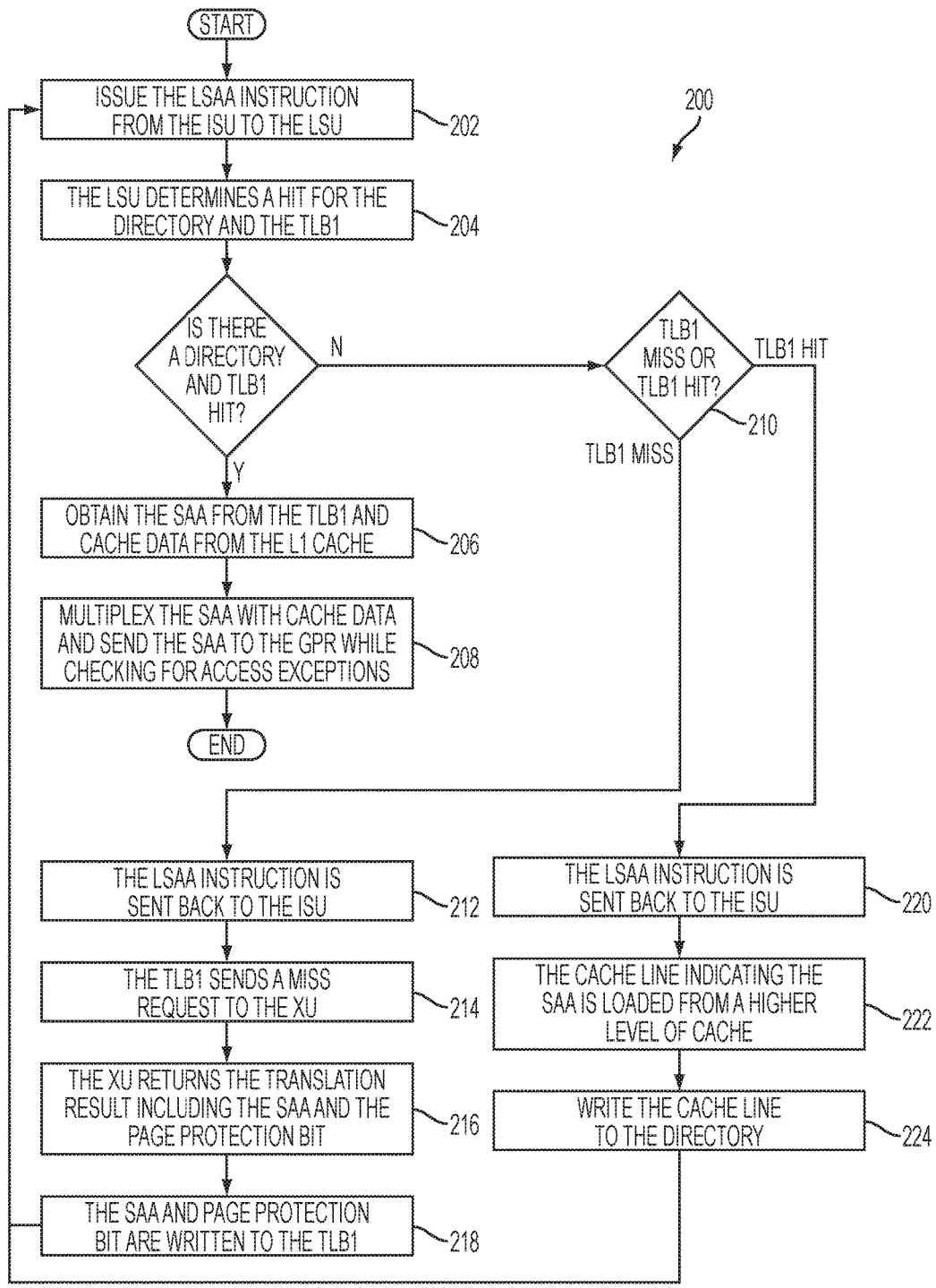
FIG. 3 depicts a process flow for loading a system-absolute address (SAA) in general purpose registers (GPRS) in accordance with an embodiment.

FIG. 3 is a process flow diagram illustrating a method 200 of storing the SAA in the GPRS 44 based on a hit in both the TLB1 36 and the directory 40. The method 200 also illustrates storing the SAA in the TLB1 36 based on a miss in the TLB1 26. The method 200 also illustrates storing the SAA in the directory 40 based on a hit in the TLB1 36 and a miss in the directory 40. The LSSA instruction 50 may be issued by the ISU 30 to load the SAA into the GPRS 44, while simultaneously checking for access exceptions. Referring to FIGS. 1-3, method 200 begins at block 202. In block 202, the LSAA instruction 50 is issued from the ISU 30 to the LSU 32. Method 200 may then proceed to block 204.

In block 204, the LSU 32 determines if there is a hit result for both the directory 40 and the TLB1 36. Specifically, if there is a hit result for both the TLB1 36 and the directory 40, then method 200 proceeds to block 206. It should be noted that while a hit result for both the directory 40 and the TLB1 36 is discussed in block 204, in some embodiments a hit result may only be needed for the TLB1 36 and not the directory 40 based on the type of computer architecture.

In block 206, the SAA is obtained from the TLB1 36 (along with the page protection bit 66), and sent to the multiplexer 60. The multiplexer 60 also receives cache data 62 from the L1 cache 38. Method 200 may then proceed to block 208.

In block 208, the multiplexer 60 may multiplex the SAA with the cache data 62 and load the SAA into the GPRS 44. During certain operations, the SAA may be needed by the accelerator 24. The central processor 20 may send the SAA to the accelerator 24 through the GPRS 44. In one embodiment, the LSAA instruction 50 also checks for access exceptions simultaneously as the SAA is loaded into the GPRS 44. Method 200 may then terminate.

If there is not a hit result for both the TLB1 36 and the directory 40 in block 204, then method 200 proceeds to block 210. In block 210, it is determined if there is a TLB1 36 miss, or a TLB1 36 hit. If there is a TLB1 36 miss, then method 200 may proceed to block 212.

In block 212, there is a TLB1 36 miss and the LSAA instruction 50 is sent back to the ISU 30. Method 200 may then proceed to block 214.

In block 214, the TLB1 36 sends the miss request 74 to the XU 22. The XU 22 may either perform the translation requested, or look up the SAA in the TLB2 48. Method 200 may then proceed to block 216.

In block 216, the XU 22 returns the results of the translation in the translation result 76 to the translation result 36. The translation result 76 includes the SAA, as well other information (e.g., the page protection bit 66). Method 200 may then proceed to block 218.

In block 218, both the SAA and the page protection bit 66 are written to the TLB1 36. The LSAA instruction 50 may then be restarted, and method 200 may return to block 202.

If there is a hit result for the TLB1 36 in block 210, then method 200 proceeds to block 220. In block 220, then the LSAA instruction 50 is sent back to the ISU 30. Method 200 may then proceed to block 222.

In block 222, a cache line indicating the SAA may be loaded from a higher level of cache (not shown in FIG. 1). Method 200 may then proceed to block 224.

In block 224, the cache line is written into the directory 40. Once the cache line is written to the directory 40, the LSAA instruction 50 may be restarted, and method 200 may return to block 202.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 4:
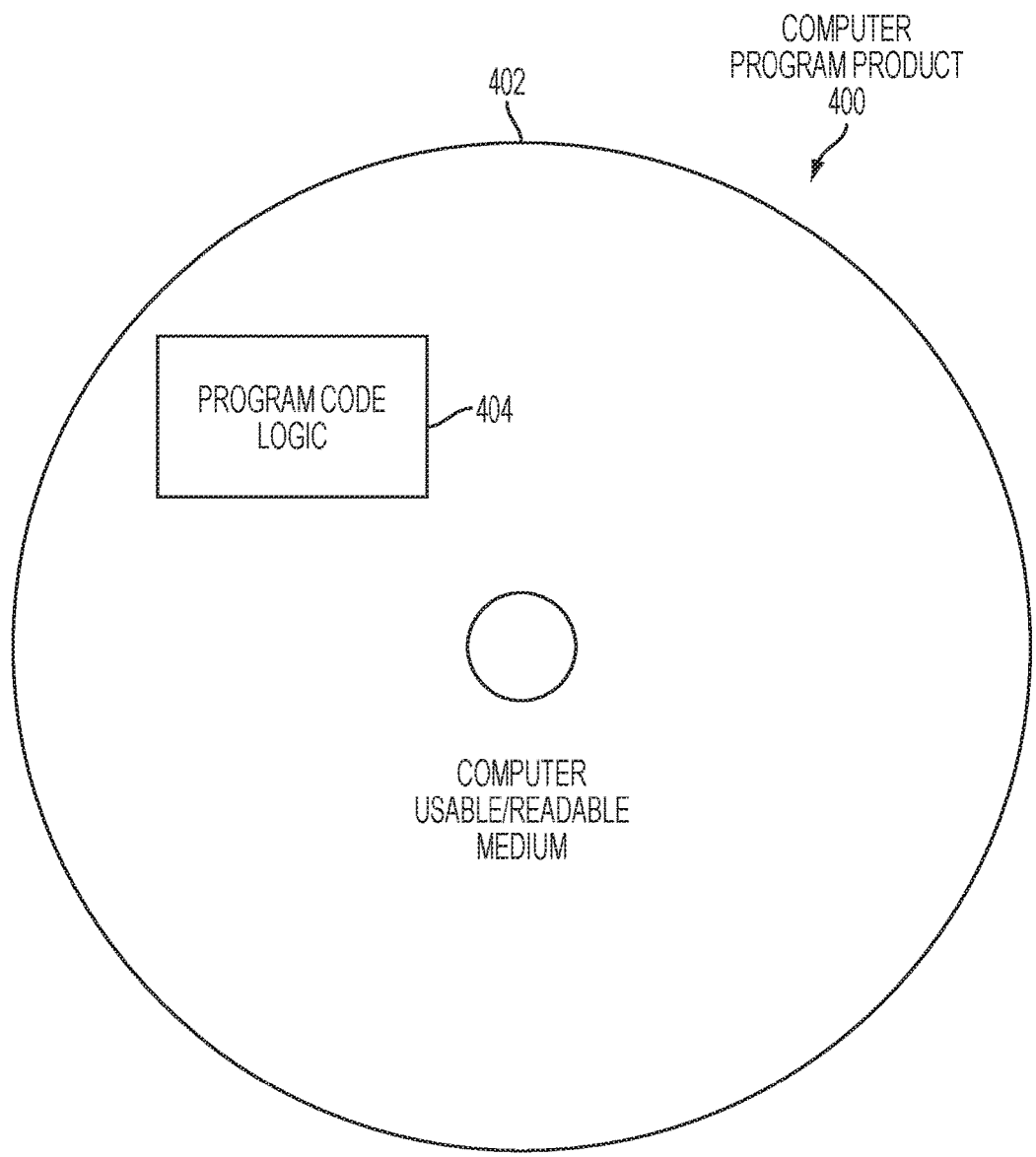
FIG. 4 illustrates a computer program product in accordance with an embodiment.

Referring now to FIG. 4, in one example, a computer program product 400 includes, for instance, one or more storage media 402, wherein the media may be tangible and/or non-transitory, to store computer readable program code means or logic 404 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Embodiments relate to a method, system and computer program product for storing a system-absolute address (SAA) in a first level look-aside buffer (TLB1). In one embodiment, the system includes a central processor including the TLB1 and general purpose registers (GPRS). The TLB1 is configured for storing the SAA. The central processor is configured for issuing a load system-absolute address (LSAA) instruction. The system includes a translation unit that is in communication with the TLB1 of the central processor. The system is configured to perform a method including determining, based on the LSAA instruction being issued, whether the SAA is stored in the TLB1. The method includes sending a translation request to the translation unit from the central processor based on the SAA not being stored in the TLB1. The method includes determining the SAA by the translation unit based on receiving the translation request. The method includes sending the SAA from the translation unit to the TLB1 and writing the SAA to the TLB1. The LSAA instruction is then restarted. The method includes obtaining the SAA from the TLB1 based on the LSAA instruction being issued, and writing the SAA to the GPRS.

In another embodiment, access exception checking is performed by the central processor based on the SAA being stored in the TLB1.

In yet another embodiment, the access exception checking includes checking for fetch-type access exceptions only, or both the fetch-type and store-type access exceptions.

In another embodiment, a bit in the LSAA instruction indicates whether the access exception checking includes checking for fetch-type access exceptions only, or both the fetch-type and the store-type access exceptions.

In yet another embodiment, the central processor includes a directory. Access exception checking is performed by the central processor based on the SAA being stored in both the TLB1 and the directory. The directory and the TLB1 store information for performing exception checking.

In another embodiment, a cache line is loaded indicating the SAA, and the cache line is written into the directory based on the SAA being stored in the TLB1 but not in the directory.

In yet another embodiment, the directory stores a storage key and the TLB1 stores a page protection bit for exception checking.

Technical effects and benefits of the data processing system 10 as described above include writing the SAA to the TLB1 36 of the central processor 20, which in turn improves latency of the data processing system 10. The data processing system 10 as disclosed also performs access exception checking simultaneously as the SAA is loaded into the GPRS 44. Some types of data processing systems currently available do not store the SAA to the TLB1 while loading the SAA into a GPRS. Instead, a translation unit having a TLB2 is used to determine the SAA. However, the translation unit is located relatively far from the central processor. Thus, every single time the SAA is needed, the translation unit determines the SAA and sends the SAA back to the central processor, thereby increasing latency. Moreover, because the SAA is stored in the TLB2, access exception checking may not be performed. This is because storage keys are not located on the TLB2, but rather on the directory of the central processor.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for storing a system-absolute address (SAA) in a first level look-aside buffer (TLB), the method comprising:
   determining, based on a load system-absolute address (LSAA) instruction being issued by a central processor, whether the SAA is stored in the first level TLB, the first level TLB located on the central processor, the translation unit being remote from and distinct from the central processor, the translation unit configured for storing a second level TLB that is distinct from the first level TLB;

sending a translation request to a translation unit from the central processor based on the SAA not being stored in the first level TLB;

determining the SAA by the translation unit based on receiving the translation request by looking up the SAA in a second level TLB that is located on the translation unit;

sending the SAA from the translation unit to the first level TLB and writing the SAA to the first level TLB;

restarting the LSAA instruction by the central processor;

determining that the SAA is stored in an entry in each of the first level TLB and the directory;

obtaining the SAA and a page protection bit corresponding to the SAA from the first level TLB based on the LSAA instruction being issued;

sending the page protection bit to the access exception checking logic;

writing the SAA and a page size to the GPRS;

while writing the SAA to the GPRS, performing access exception checking for the SAA by the access checking logic based on the page protection bit, the access exception checking comprising:

based on the page protection bit having a first value, only checking for fetch-type access exceptions corresponding to the SAA; and based on the page protection bit having a second value that is distinct from the first value, checking for both fetch-type access exceptions and store-type access exceptions corresponding to the SAA; and providing the SAA from the GPRS to an accelerator.

* * * * *